(12) United States Patent
Roskovensky et al.

(10) Patent No.: US 8,094,886 B1
(45) Date of Patent: Jan. 10, 2012

(54) THERMAL WAKE/VESSEL DETECTION TECHNIQUE

(75) Inventors: John K. Roskovensky, Albuquerque, NM (US); Prabal Nandy, Albuquerque, NM (US); Brian N Post, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 358 days.

(21) Appl. No.: 12/574,741

(22) Filed: Oct. 7, 2009

(51) Int. Cl.
*G06K 9/00* (2006.01)
*G06K 9/62* (2006.01)

(52) U.S. Cl. ......... 382/103; 382/180; 382/203; 382/225

(58) Field of Classification Search ........... 382/100–320
See application file for complete search history.

(56) References Cited

U.S. PATENT DOCUMENTS

| | | | |
|---|---|---|---|
| 4,104,609 A * | 8/1978 | Minegishi et al. | 367/110 |
| 4,899,580 A * | 2/1990 | Leguet et al. | 73/148 |
| 5,231,401 A * | 7/1993 | Kaman et al. | 342/55 |
| 6,891,534 B2 * | 5/2005 | Futamura et al. | 345/419 |
| 7,480,052 B1 | 1/2009 | Roskovensky | |
| 7,768,551 B2 * | 8/2010 | Yang et al. | 348/208.99 |
| 2002/0140696 A1 * | 10/2002 | Futamura et al. | 345/419 |
| 2010/0296743 A1 * | 11/2010 | Tsunashima | 382/218 |
| 2011/0254950 A1 * | 10/2011 | Bibby et al. | 348/135 |

FOREIGN PATENT DOCUMENTS

JP 2000067400 A * 3/2000

OTHER PUBLICATIONS

"Pearson product-moment correlation coefficient", Wikipedia, the free encyclopedia, retrieved from internet on Aug. 24, 2009, 7 pages.

* cited by examiner

*Primary Examiner* — Manav Seth
(74) *Attorney, Agent, or Firm* — Cory G. Claassen

(57) ABSTRACT

A computer-automated method for detecting a vessel in water based on an image of a portion of Earth includes generating a thermal anomaly mask. The thermal anomaly mask flags each pixel of the image initially deemed to be a wake pixel based on a comparison of a thermal value of each pixel against other thermal values of other pixels localized about each pixel. Contiguous pixels flagged by the thermal anomaly mask are grouped into pixel clusters. A shape of each of the pixel clusters is analyzed to determine whether each of the pixel clusters represents a possible vessel detection event. The possible vessel detection events are represented visually within the image.

25 Claims, 10 Drawing Sheets

THERMAL WAKE/VESSEL DETECTION TECHNIQUE

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to detection of vessels operating in water.

BACKGROUND INFORMATION

Conventional techniques for detection and identification of ships in open water are human intensive. One such technique simply includes the visual inspection of aerial photographs by a live human being. Since the ships themselves typically appear as small dots in the photographs, the human photograph inspectors often search for telltale signs of a ship, such as their wakes. Not only is this technique labor intensive, but the vastness of the open oceans renders this technique limiting. Only so many square miles of open ocean photographs can be visually inspected by a human being (or even a group of human beings) in a reasonable period of time, before the photographs become stale (i.e., any spotted vessel will have long since departed from the photographed region).

Another conventional technique is the use of radar. However, radar is limited in its range by the curvature of the earth and typically cannot extend much past the horizon. Again, use of radar to detect and identify a ship in open waters still requires active monitoring by a human operator.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
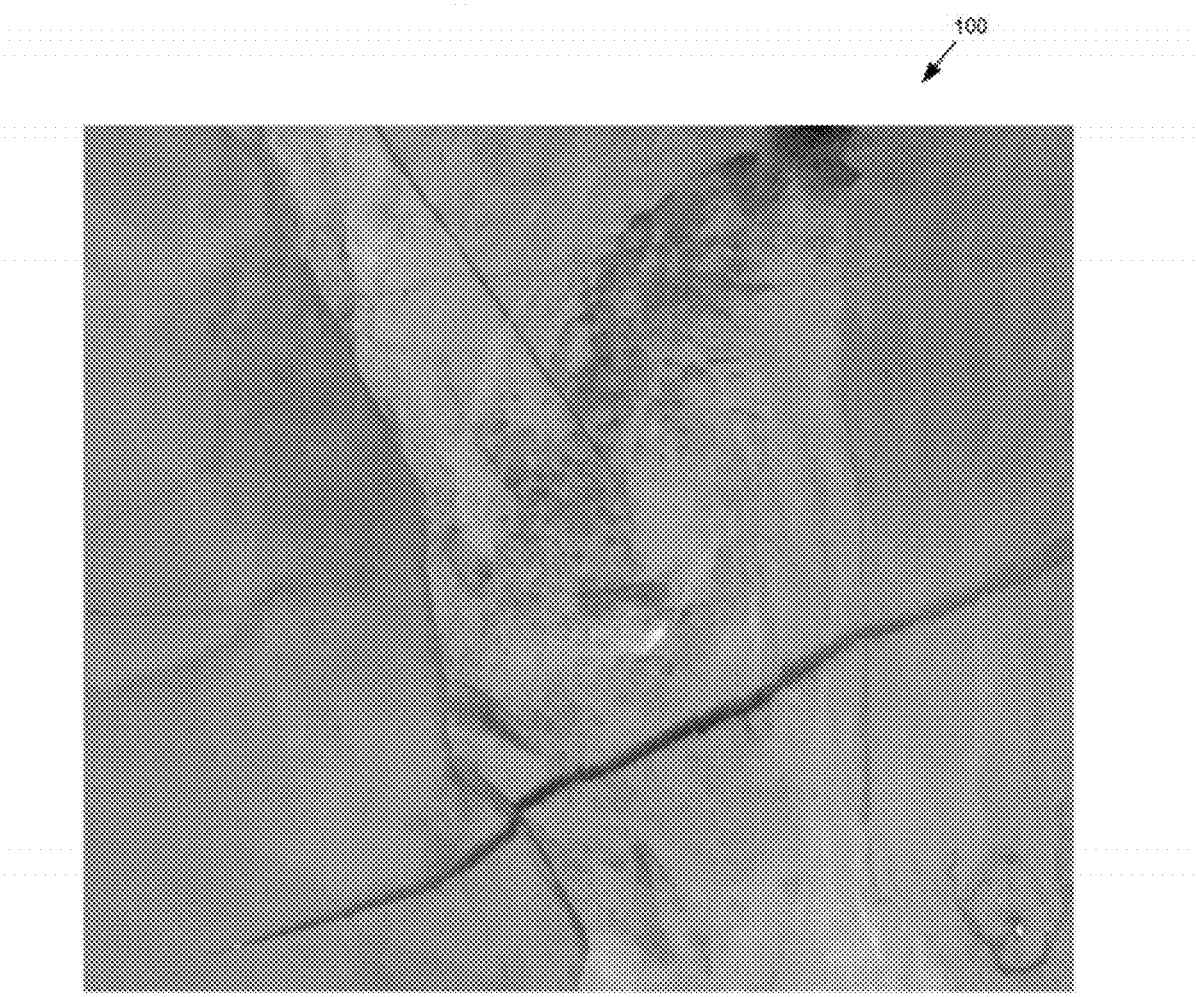
FIG. 1 is an image of a portion of Earth having an aerial perspective which is analyzed in an automated fashion for detecting vessels in water, in accordance with an embodiment of the invention.

Embodiments of a system and technique for detecting vessels in water (or by extension detecting a vessel's wake and thereby detecting the vessel) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the thermal wake/ship detection technique described herein may be used to detect a vessel operating in water (e.g., open-ocean, lakes, rivers, bays, seas, etc.) either directly (e.g., hot ship thermal signatures), or indirectly via detection of its wake (e.g., cool or warm wake thermal signatures). The technique accurately detects vessels using aerial perspective images, while limiting the number of false positives. The aerial perspective images may be taken from a satellite, a plane, a mountain top perch, or other high altitude vantage point. Furthermore, the technique is capable of full automation, that is, it does not require live human input to operate. The technique can analyze hundreds of images and point out possible ship detection events while reducing time and cost when compared to human inspections.

The thermal wake/ship detection technique is designed to utilize at least one thermal channel (e.g., infrared channel), such as, the mid-wave infrared (MWIR) and/or long-wave infrared (LWIR) channels. The thermal wake/ship detection technique can run effectively with one or more spectral bands that are accurately co-registered to the ground. Criteria include that the bands should have see-to-the-ground capability and be sensitive to temperature variations on the water's surface. As a result, spectrally broad bands should be located where the atmospheric transmittance is high, away from gas absorption regions. In addition, the technique can be run in both daytime and nighttime conditions, but during the day, care should to be taken to use bands that do not reflect too much solar energy such that the thermal signal is overcome. This may occur in MWIR bands where a whitewater wake accompanies a thermal wake or in specular glint conditions. For example, the infrared (IR) channel(s) should have wavelengths greater than approximately 3.7 μm. In one embodiment, an IR channel wavelength approximately between 8.6 µm and 12 µm with a bandwidth of 1000 nm is used. In other embodiments, a spectral range of 4.7 µm to 5.1 µm or 3.7 µm to 4.2 µm may be used. In these other embodiments, steps may need to be taken to avoid sun-glint regions during daytime operation. In some embodiments, spatial resolution of the image sensor is equal to or less than approximately 20 m.

Thermal wakes are produced by vessels when they churn up the water's surface by bringing up deeper water with a different temperature. The greater the temperature difference between the wake and that of the ambient surface (or skin temperature), the greater the chance of a successful detection. This temperature difference and the persistence of the wake are determined by several things including the speed and draft of the vessel, the water's vertical temperature profile, and the sea state. It is apparent that a fast vessel with a large draft will churn up a greater amount of deep water that is more likely to be colder than the surface and produce a strong, persistent wake. Also, less water mixing will occur when the sea state is calm which will lead to longer, more persistent thermal wakes.

Generally, the temperatures of thermal wakes are different from the ambient surface temperature by anywhere from 0.1 K to 0.5 K. This is not a large value so the detection of thermal wakes also depends greatly on the sensitivity of the detector, the quality of the data, how it is collected, and atmospheric conditions. Since water vapor absorbs continually throughout the IR spectral region, atmospheric path length determined by the sensor view angle and the water vapor concentration are limiting factors to the detection of thermal wakes. In addition, aerosols, particularly hydroscopic ones which promote water condensation and produce haze, can reduce the temperature contrast of the wakes as seen from above. Clouds absorb at all IR wavelengths and thus emit as well. Because clouds are above the surface and generally cooler than the surface, they produce lower observed radiance and generate high scene temperature contrasts as well. Lastly, oceans contain natural temperature gradients such as currents, outflow from rivers and anthropogenic sources, gyres, and the meeting of different water masses. These other environmental temperature gradients often exceed those of ship wakes.

In order to detect thermal wakes characterized by a temperature difference in the range 0.1 K-0.5 K with respect to the background, the sensor should use spectral bands that have relatively low noise equivalent differential temperatures (or Luminace, etc), and thus the ability to discriminate thermal wakes from noise. In one embodiment, a sensor having a low noise equivalent differential temperature (NeΔT according to Planck's Law) sensitivity of less than approximately 0.5 K is used. To mitigate clear sky atmospheric effects, sensor viewing angles should generally be within 30° of nadir. Since the width of thermal wakes are generally on par with the vessel's beam or width, spatial resolution or pixel size should ideally be near or smaller than that of the width of the expected wake (e.g., spatial resolution of less than approximately 20 m).

FIG. 1 is an example image 100 of a portion of Earth, which is analyzed in an automated fashion using the thermal wake/ship detection techniques described herein, in accordance with an embodiment of the invention. Image 100 is an aerial perspective image, based on IR radiance values. In some embodiments, the IR radiance values may be used to execute the thermal wake/ship detection technique to generate one or more thermal anomaly masks and one or more ship detection masks, which may then be superimposed on, or otherwise overlay, a visual spectrum or IR spectrum image 100.

Figure 2:
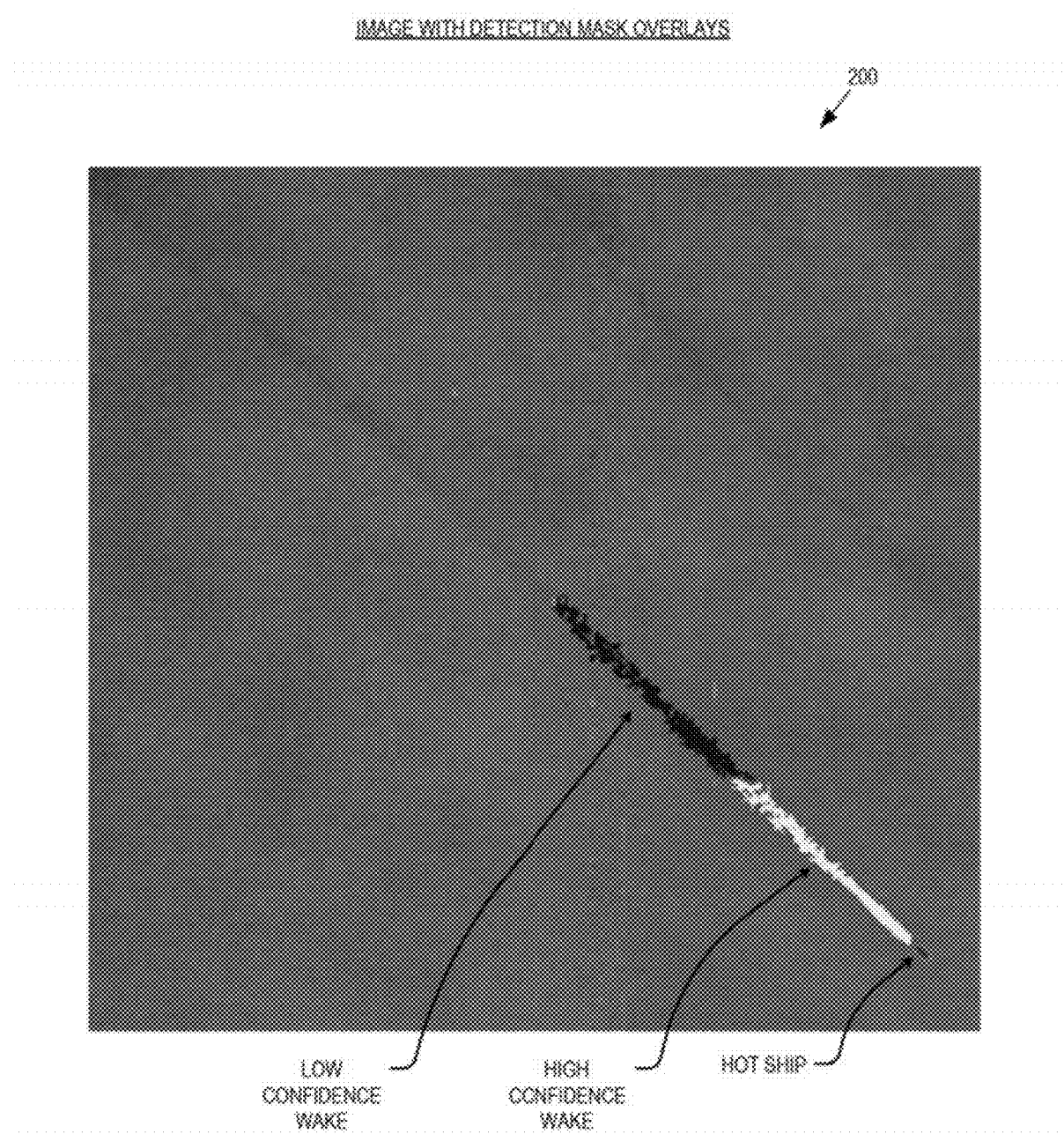
FIG. 2 is an image of a portion of Earth visually indicating a possible vessel detection event including indications of high and low confidence wake detection events and a hot ship detection event, in accordance with an embodiment of the invention.

FIG. 2 illustrates an image 200 of a portion of Earth with one or more detection mask overlays visually indicating a possible vessel detection event, in accordance with an embodiment of the invention. In the illustrated example, a hot ship signature is identified by a collection of hot ship pixels, a first wake signature is identified as a high confidence wake detection, and a second wake signature is identified as a low confidence wake detection. The hot ship, high confidence wake, and low confidence wake detection events may be indicated using a variety of visual markers including colors, geometric shapes (e.g., circles, rectangles, triangles), highlights, animations, blinking shapes/colors, etc. Because the process is automated without human intervention, large swaths of water can be monitored, in real-time using real-time or near real-time IR imagery. Furthermore, the technique operates with passive imaging of the Earth using radiance values, as opposed to active radar, which can alert the target vessel of the surveillance.

Figure 3:
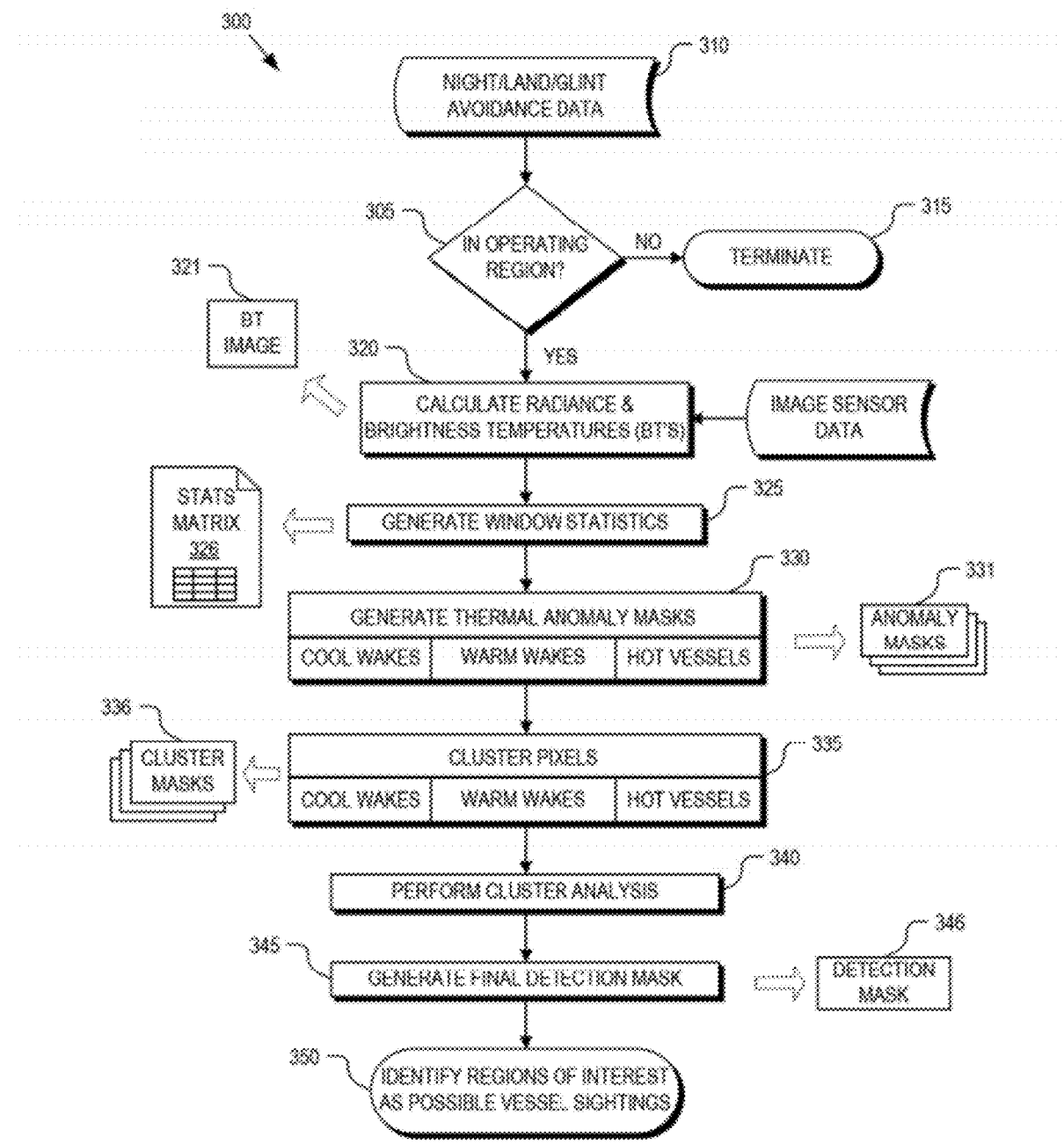
FIG. 3 is a flow chart illustrating a process for automated thermal detection of vessels in water, in accordance with an embodiment of the invention.

FIG. 3 is a flow chart illustrating a process 300 for automated thermal detection of vessels in water, in accordance with an embodiment of the invention. Process 300 is described with reference to FIGS. 4-6. The order in which some or all of the process blocks appear in process 300 should not be deemed limiting. Rather, one of ordinary skill in the art having the benefit of the present disclosure will understand that some of the process blocks may be executed in a variety of orders not illustrated.

In a decision block 305, process 300 determines whether or not the image data being analyzed falls within an operation region, and by extension, whether or not to employ the thermal vessel detection technique by proceeding with process 300. Process 300 determines whether or not to employ based on night/land/glint data 310. In one embodiment, the thermal vessel detection process will not be employed if either of the following conditions are true: 1) the image (e.g., image 100) was taken of a portion of Earth labeled as "land," or 2) the image was taken of a portion of Earth that is labeled as a daytime "glint region" and a MWIR spectral range of 3.7 µm to 5.1 µm is being used. The pixel location of each pixel within the image is identified through the position and attitude of the sensor along with the pointing information of the sensor's telescope. If a given pixel or image maps onto a region that satisfies either condition 1 or 2 described above, then the thermal vessel detection technique is not employed (termination block 315) for that pixel.

In one embodiment, a region is labeled as "daytime" if it is located at a position with a solar zenith angle less than 85°, indicating daytime conditions. Of course, the selection of the solar zenith angle may be adjusted smaller or greater, as desired. A region may be labeled as "land" if the region or pixel maps onto land as specified by a reference map, such as geographic information system ("GIS") map. In one embodiment, a multi-pixel (e.g., 10 pixel) buffer is added in all directions around pixels that meet one or more of the avoidance conditions.

If the avoidance conditions are cleared for a given set of pixels, then the thermal vessel detection technique may be employed on those pixels. In a process block 320, pixel radiance and brightness values are calculated and/or accessed from the image data. The thermal vessel detection technique can run on one or more MWIR to LWIR bands. The technique initially converts data numbers (DN) directly from the sensor into radiance using the established offset and scale factor derived through calibration efforts for the sensor. These radiance fields are then de-striped or filtered to remove artifacts in the data. The new filtered/de-striped radiances are then used to calculate brightness temperatures (BT) using Planks Law (Eq 1) by solving for the BT variable T.

$$I(v, T) = \frac{2hV^2}{c^2} \times \frac{1}{e^{\frac{hV}{kT}-1}}$$ (Eq 1)

Although the BT conversion to generate a BT image 321 is useful in understanding the data, it is not necessary for the accurate operation of the thermal vessel detection technique as thermal contrasts and appropriate pattern distributions exist in the DN, Radiance, and BT values. In one embodiment, image 100 is a BT image. Unless otherwise stated, the thermal image values and thresholds discussed below are given as BT values. The thermal wake to background signal-to-noise ratio (SNR) may be increased with the addition of several bands that are sensitive to surface temperature and are co-registered. The number of bands used as input is user selectable.

In a process block 325, window statistics are generated based on BT image 321 and output into a statistics matrix 326. In one embodiment, the window statistics are generated by separating the pixels of BT image 321 into a plurality of overlapping groups of pixels (also referred to as "windows") and calculating separate set of statistical values on the BT values of each window or pixel group. In one embodiment, the statistical values generated for each window includes calculating a mean or average BT value and a standard deviation of the BT values within the given pixel group.

Figure 4:
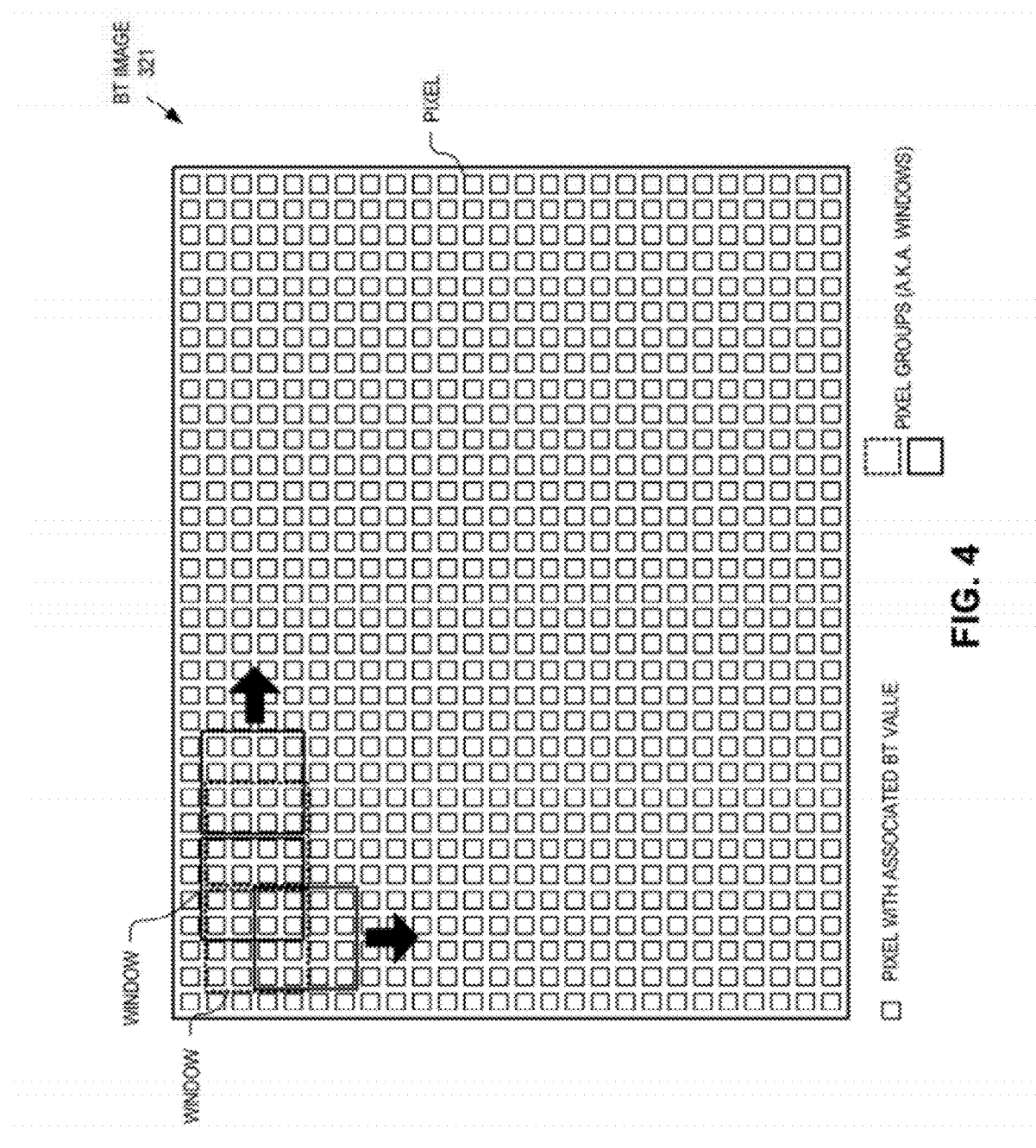
FIG. 4 illustrates overlapping groups of pixels for calculating means and standard deviations of the pixel groups to generate thermal anomaly mask(s), in accordance with an embodiment of the invention.

FIG. 4 illustrates an example of "windowing" or logically separating the pixels of BT image 321 into overlapping groups of pixels. In one embodiment, each window corresponds to an 800 m by 800 m square region of Earth. In an embodiment where each pixel corresponds to a ground sample distance (GSD) of 20 m by 20 m, the windows include groups of 20 by 20 pixels. Of course, larger or smaller windows covering larger or small GSDs may be used. Each horizontal neighboring window may be offset by 1 or more pixels. Similarly, each vertically neighboring window may be offset by 1 or more pixels. In one embodiment, in order increase computational speed and reduce memory consumption associated with windowing and generation of statistics matrix 326, each horizontal and vertical neighboring window is offset by 10 pixels by incrementing 10 pixels between adjacent windows within a given row and a given column.

Figure 5:
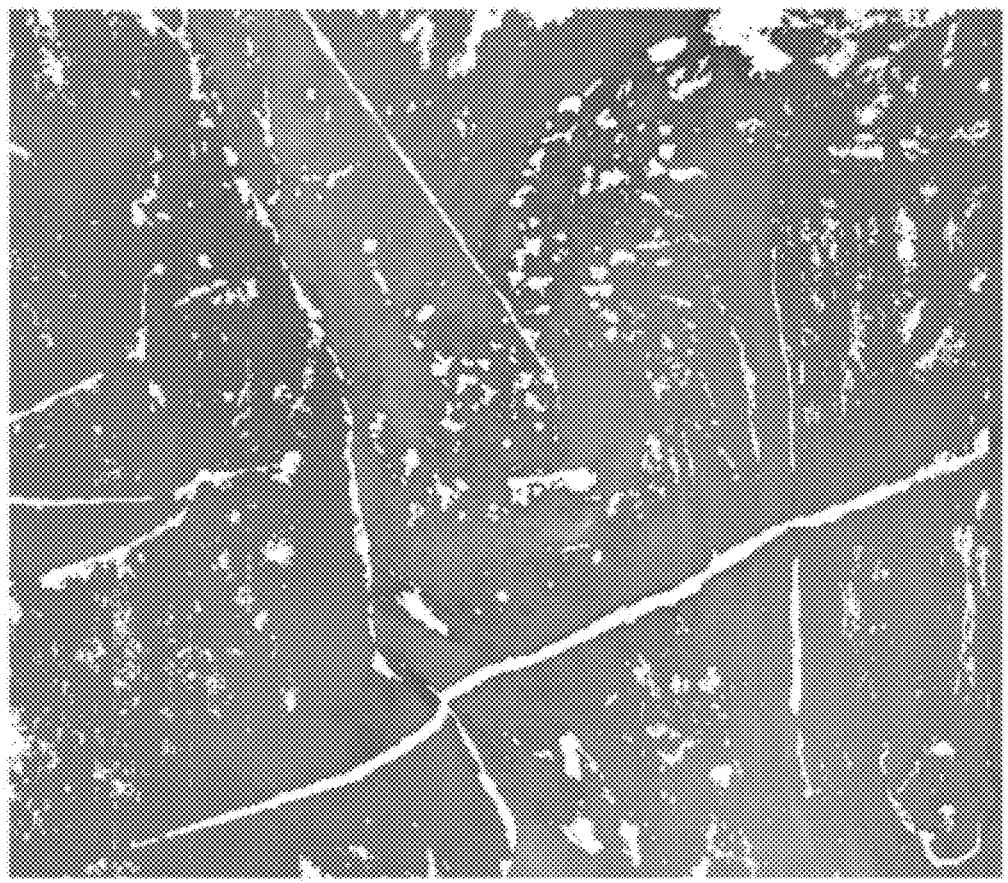
FIG. 5 illustrates a cool thermal anomaly mask overlaying an image of a portion of Earth, in accordance with an embodiment of the invention.

In a process block 330, the window statistics are used to generate thermal anomaly masks 331. In one embodiment, three separate thermal anomaly masks are generated: a cool thermal anomaly mask, a warm thermal anomaly mask, and a hot thermal anomaly mask. It should be appreciated that embodiments of process 300 may operate using one, two, or all three thermal anomaly masks 334. Thermal anomaly masks 331 identify thermal anomalies within BT image 321, which may or may not eventually be determined to be a vessel or a vessel's wake. In this manner, thermal anomaly masks 331 may be viewed as initial thermal detection tests. The cool thermal anomaly mask identifies pixels within BT image 321 that may correspond to cool wakes (e.g., cool water turned up by a prop or the draft of a vessel underway). The warm thermal anomaly task identifies pixels within BT image 321 that may correspond to warm wakes due to temperature inverted waters (e.g., warm water turned up by a prop or the draft of a vessel underway). The hot thermal anomaly mask identifies pixels within BT image 321 that may correspond to hot ships (e.g., smoke stacks, dark painted hulls, etc.). In one embodiment, each of the thermal anomaly masks 331 is a binary mask that may be used to overlay BT image 321 and which indicates whether each corresponding pixel within BT image 321 represents a thermal anomaly (e.g., bit value='1') or not (e.g., bit value='0'). FIG. 5 illustrates an example cool thermal anomaly mask overlaying image 100. Generation of thermal anomaly masks 331 is discussed in greater detail below in connection with FIG. 7.

After generating thermal anomaly masks 331, process 300 continues to a process block 335. In process block 335, the pixels flagged as thermal anomalies by thermal anomaly masks 331 are grouped into pixel clusters. In one embodiment each thermal anomaly mask 331 is analyzed separately to generate a separate cluster mask 336. Process block 335 operates to group adjacent pixels flagged as thermal anomalies within their respective thermal anomaly masks 331 into clusters of contiguous thermal anomalous pixels. Once grouped, each pixel cluster is numbered or otherwise labeled for separate identification and processing in the subsequent processing blocks of process 300.

In a process block 340, each pixel cluster, as identified and grouped by cluster masks 336, is analyzed to identify and eliminate false detections (discussed in greater detail in connection with process 800 illustrated in FIG. 8). This analysis may include analyzing a size and shape of each pixel cluster and by performing a thermal gradient test on the water on either side of a potential wake. In one embodiment, if a pixel cluster is deemed to be a false detection based on the cluster analysis, then the associated one of thermal anomaly masks 331 may be updated to unflag the pixels associated with the pixel cluster. In one embodiment, the cluster analysis may further assign a confidence level to each pixel cluster deemed to be a possible vessel detection event. In one embodiment, cluster masks 336 may be updated to reflect the confidence level determination (e.g., high confidence wake or low confidence wake).

Figure 6:
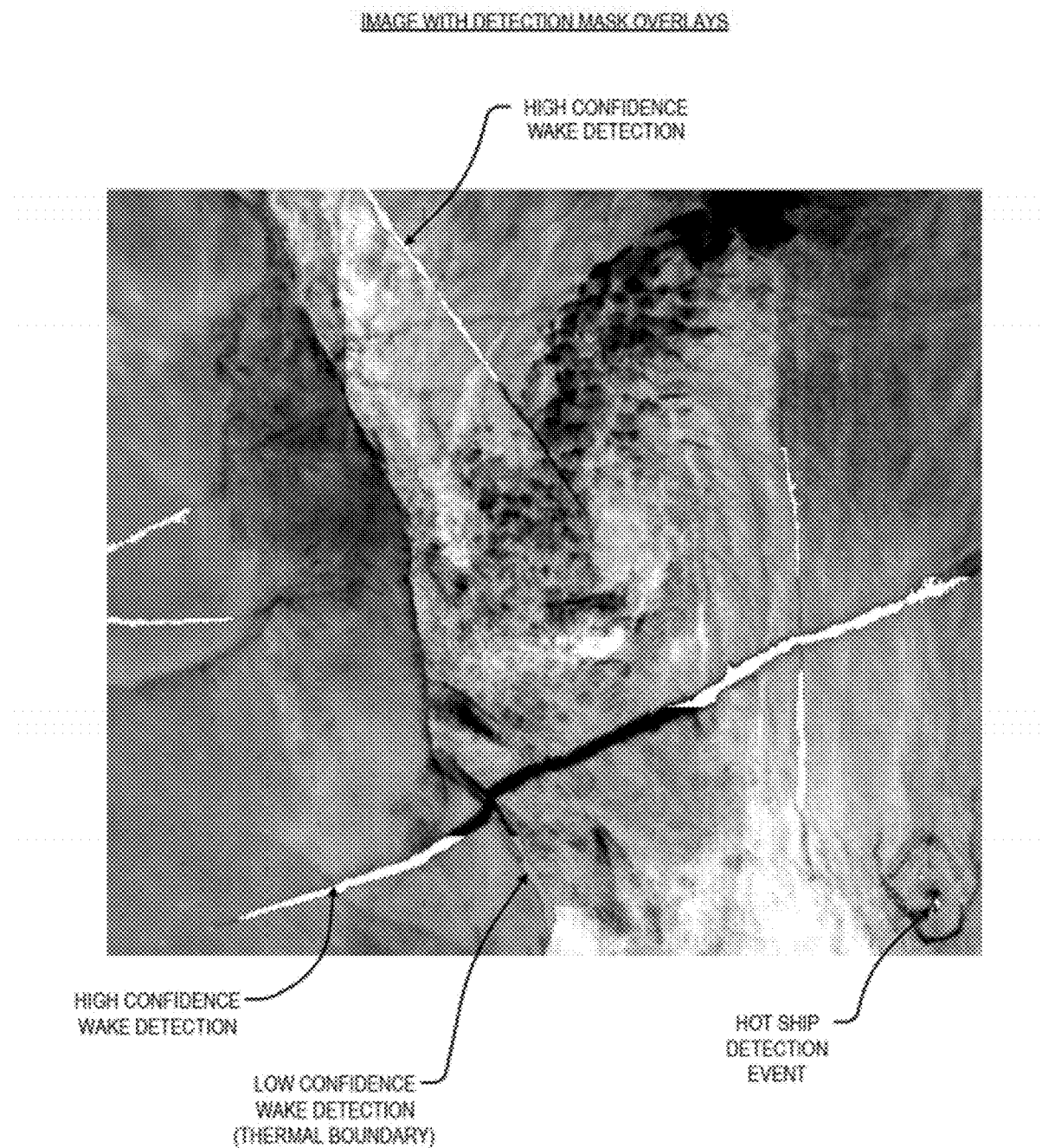
FIG. 6 illustrates an image of a portion of Earth with detection mask overlays, in accordance with an embodiment of the invention.

In a process block 345, a final detection mask 346 may be generated. In one embodiment, final detection mask 346 is a combination overlay of thermal anomaly masks 331 after the cluster analysis performed in process block 340 has filtered pixel clusters deemed to be false detections and assigned confidence levels to the remaining pixel clusters. FIG. 6 illustrates an example final detection mask 600 overlaying image 100 of a portion of Earth. As illustrated, the confidence level of cool or warm wake detections may be color keyed or otherwise visually distinguished. Similarly, hot ship detections may have a unique visual indicator, as well. Returning to FIG. 3, in a process block 350, each possible vessel sighting may be identified as a region of interest by rendering explicit visual indicators over image 100 using colors, geometric shapes, annotations, animations, highlights, or otherwise.

Figure 7:
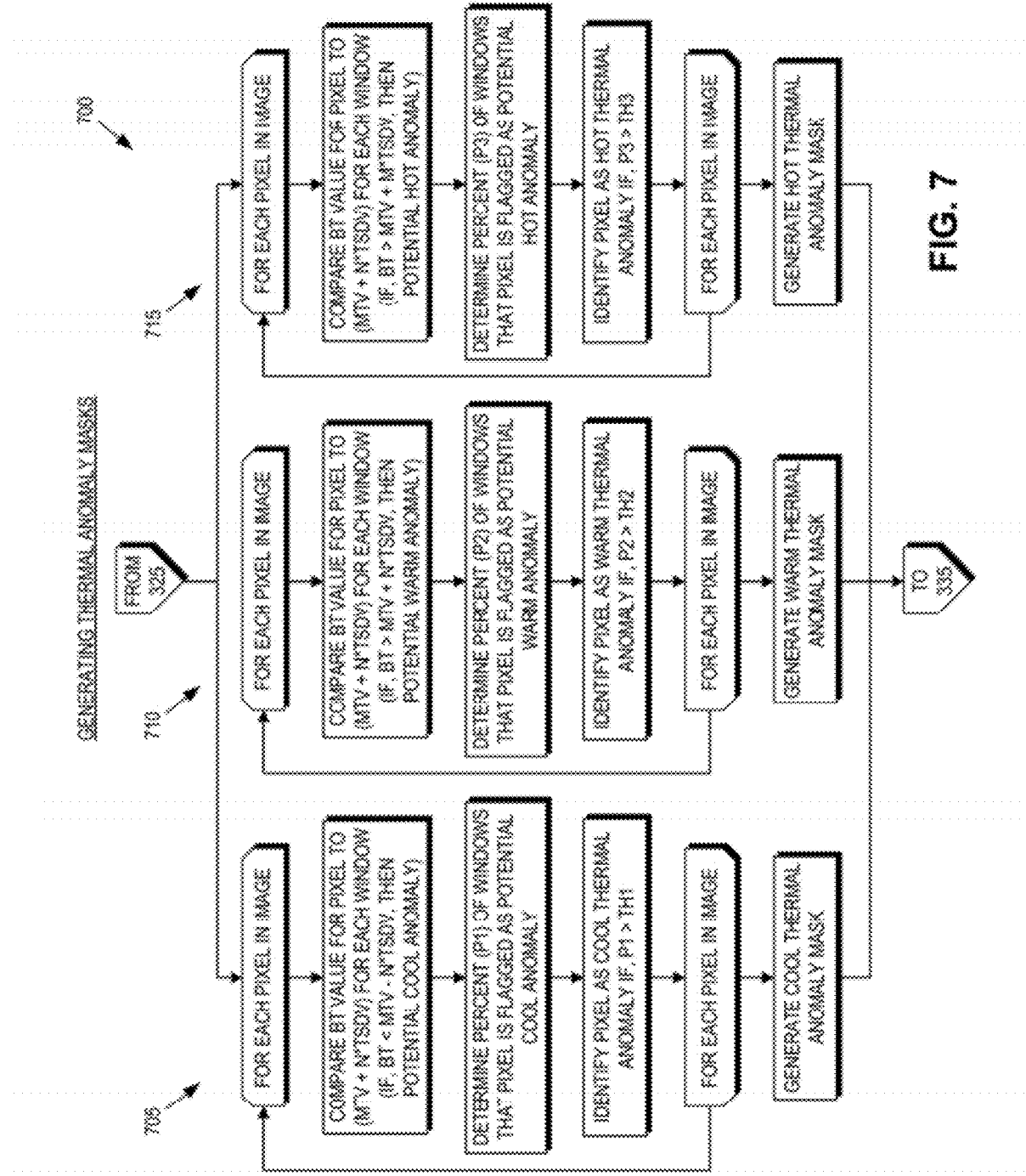
FIG. 7 is a flow chart illustrating a process for generating three thermal anomaly masks, in accordance with an embodiment of the invention.

FIG. 7 is a flow chart illustrating a process 700 for generating thermal anomaly masks 331, in accordance with an embodiment of the invention. Process 700 represents greater detail for performing process block 330 in FIG. 3, and thus, in one embodiment may be viewed as an extension of process 300. The order in which some or all of the process blocks appear in process 700 should not be deemed limiting. Rather, one of ordinary skill in the art having the benefit of the present disclosure will understand that some of the process blocks may be executed in a variety of orders not illustrated.

Thermal anomaly masks 331 are generated with reference to the windows and window statistics created in process block 325. As mentioned above, a mean thermal value (MTV) and a thermal standard deviation value (TSDV) are calculated for each window. To generate the cool thermal anomaly mask (sub-process 705), for a given pixel in question, if its BT value (BT) is less than N*TSDVs, where 'N' is a positive real number, below the MTV for the given window, then that pixel is counted as a "potential" cool thermal anomaly (e.g., BT<MTV−N*TSDV). If the pixel is counted as a potential cool thermal anomaly for at least a threshold percentage TH1 of the windows in which the given pixel is a member, then the pixel is flagged as a cool thermal anomaly within the cool thermal anomaly mask. Similarly, to generate the warm thermal anomaly mask (sub-process 710), for a given pixel in question, if its BT value (BT) is greater than N*TSDVs above the MTV for a given window, then that pixel is counted as a "potential" warm thermal anomaly (e.g., BT>MTV+N*TSDV). If the pixel is counted as a potential warm thermal anomaly for at least a threshold percentage TH2 of the windows in which the given pixel is a member, then the pixel is flagged as a warm thermal anomaly within the warm thermal anomaly mask. Finally, to generate the hot thermal anomaly mask (sub-process 715), for a given pixel in question, if its BT value (BT) is greater than M*TSDVs, where 'M' is a positive real number, above the MTV for a given window, then that pixel is counted as a "potential" hot thermal anomaly (e.g., BT>MTV+M*TSDV). If the pixel is counted as a potential hot thermal anomaly for at least a threshold percentage TH3 of the windows in which the given pixel is a member, then the pixel is flagged as a hot thermal anomaly within the hot thermal anomaly mask. In one embodiment, TH1=TH2=TH3=50%-80%, N=2.3, and M=5. Of course, other values for N, M, TH1, TH2, and TH3 may be used. Furthermore, in some embodiments, the value of 'N' may be different for identifying potential cool thermal anomalies than is used to identify potential warm thermal anomalies.

Figure 8:
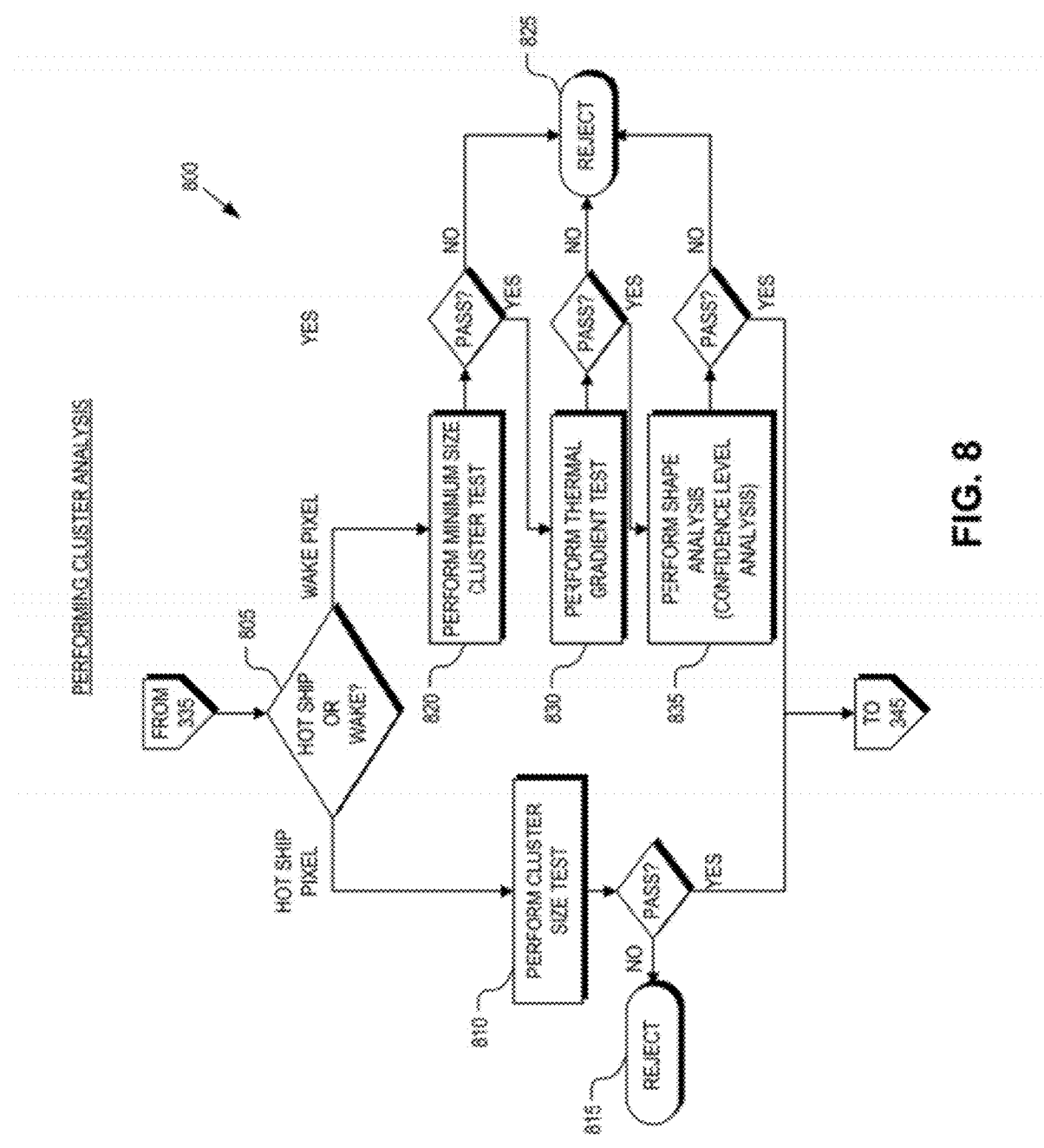
FIG. 8 is a flow chart illustrating a process of cluster analysis, in accordance with an embodiment of the invention.

FIG. 8 is a flow chart illustrating a process 800 for cluster analysis, in accordance with an embodiment of the invention. Process 800 represents greater detail for performing process block 340 in FIG. 3, and thus, in one embodiment may be viewed as an extension of process 300. In one embodiment, process 800 is repeated for each pixel cluster identified and labeled within cluster masks 336. The order in which some or all of the process blocks appear in process 800 should not be deemed limiting. Rather, one of ordinary skill in the art having the benefit of the present disclosure will understand that some of the process blocks may be executed in a variety of orders not illustrated.

In a decision block 805, if the pixel cluster is a cluster of hot thermal anomalies determined from the hot thermal anomaly mask, then process 800 continues to a process block 810. In process block 810, a cluster size test is executed to determine whether the pixel cluster is appropriately sized to potentially represent a hot vessel, or otherwise deemed to be too small or too large and therefore rejected as noise or a false detection. If the pixel cluster fails the cluster size test, then the pixel cluster is rejected (process block 815) as a false detection. In one embodiment, the cluster size test looks for pixel clusters having a number of pixels (NP) of: 80/GSD<NP<1600/GSD. In the example of a GSD=20 m, this equates to: 4<NP<80. Of course, other minimum and maximum NP thresholds may be used.

Returning to decision block 805, if the pixel cluster is a cluster of cool thermal anomalies or warm thermal anomalies (i.e., potential wake pixels) determined from the cool or warm thermal anomaly masks, then process 800 continues to a process block 820. In process block 820, a minimum size cluster test is executed to determine whether the pixel cluster is sufficiently large to potentially represent a wake, or otherwise deemed to be too small and rejected as a false detection event (process block 825). In one embodiment, the minimum cluster size cluster test looks for pixel clusters having an NP of >1000/GSD. In the example of GSD=20 m, this equates to: NP>50. Of course, other minimum NP thresholds may be used.

In a process block 830, a thermal gradient test is executed to determine whether the pixel cluster may represent a naturally occurring thermal boundary between two water masses of differing temperatures and therefore rejected as a false detection event. In one embodiment, the thermal gradient test compares BT values of pixels on either side of the pixel cluster and if the difference is sufficiently large, then the pixel cluster is deemed to be a naturally occurring thermal boundary and rejected (process block 825). In one embodiment, two 10×10 pixel regions—one on each side of the pixel cluster—a fixed distance (e.g., 30 pixels out from a best fit line running through the elongated length of the pixel cluster) on either side of the pixel cluster are compared. If a difference of the average BT value of each opposing side pixel region is greater than a threshold difference (e.g., greater than 0.2 K), then the pixel cluster is deemed to be a naturally occurring thermal boundary and rejected.

Figure 9:
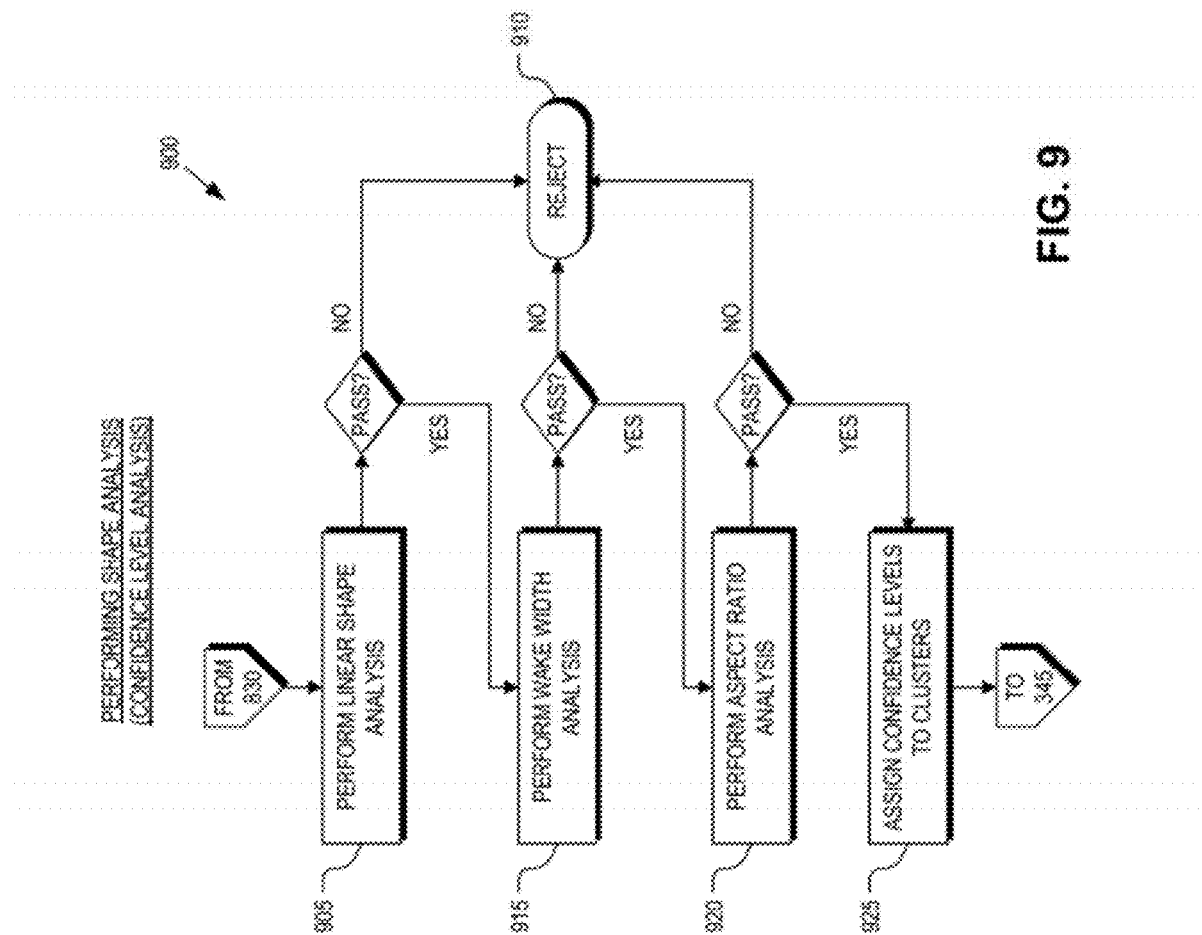
FIG. 9 is a flow chart illustrating a process of shape analysis to generate a wake detection confidence level indication, in accordance with an embodiment of the invention.

In a process block 835, a shape of the pixel cluster is analyzed to determine whether its shape sufficiently resembles a wake (e.g., straight, narrow, and elongated) to be deemed a potential wake. If the shape of the pixel cluster fails to pass one or more shape analysis tests, then the pixel cluster is rejected as a false detection (process block 825). In one embodiment, one or more of the shape analysis tests are not merely a pass/fail test, but rather the results may be used to assign confidence levels to the pixel cluster. For example, the results of the shape analysis may be used to either: 1) reject the pixel cluster as not a wake, or 2) pass the pixel cluster as a potential wake sighting and designate the pixel cluster as a low confidence wake detection event or a high confidence wake detection event FIG. 9 is a flow chart illustrating a process 900 of shape analysis to generate a wake detection confidence level indication, in accordance with an embodiment of the invention. Process 900 represents greater detail for performing process block 835 in FIG. 8, and thus, in one embodiment may be viewed as an extension of process 800. The order in which some or all of the process blocks appear in process 900 should not be deemed limiting. Rather, one of ordinary skill in the art having the benefit of the present disclosure will understand that some of the process blocks may be executed in a variety of orders not illustrated.

In a process block 905, a linear shape analysis is performed on each pixel cluster. In one embodiment, the linear shape analysis outputs a linear correlation coefficient r, for a given pixel cluster, which is indicative of the degree to which the given pixel cluster is linear. In other words, the linear shape analysis indicates the degree to which the shape of given pixel cluster follows a straight path. For example, the linear shape analysis may be implemented as a Pearson Linear Correlation test. In one embodiment, if the linear coefficient r>0.8, then the outcome of the linear shape analysis counts towards a high confidence wake designation; if the linear coefficient r is 0.8>r>0.6, then the outcome of the linear shape analysis counts towards a low confidence wake designation; if the linear coefficient r<0.6, then the given pixel cluster is rejected as a false detection event (process block 910) for being insufficiently linear to represent a wake.

In a process block 915, a wake width analysis is performed on each pixel cluster. In one embodiment, the wake width analysis determines a percentage of wide pixels value (PWP). The PWP is a measurement of the percentage of the given pixel cluster that is wider than a maximum width value (MAX_WIDTH). In one embodiment, MAX_WIDTH=160/

GSD or 8 pixels for a sensor resolution of 20 m per pixel. The width of the given pixel cluster may be measured normal from a best fit line running through the elongated length of the given pixel cluster. In one embodiment, if PWP<8%, then the outcome of the wake width analysis counts towards a high confidence wake designation; if 8%<PWP<14%, then the outcome of the wake width analysis counts towards a low confidence wake designation; if PWP>14%, then the given pixel cluster is rejected as a false detection event (process block 910) for being too wide to represent a wake.

In a process block 920, an aspect ratio analysis is performed on each pixel cluster. The aspect ratio analysis determines whether the aspect ratio of the given pixel cluster is sufficiently slender to resemble a wake. In one embodiment, the aspect ratio is determined by calculating the length and width of the given pixel group based on a best fit line running through the elongated length of the given pixel cluster. The length of the pixel group may be determined as the maximum length of the best fit line and the width of the pixel group may be determined based on an average width as measured normal to the best fit line along the length of the pixel group. The aspect ratio (AR) is the ratio LENGTH:WIDTH. In one embodiment, AR is compared to a threshold AR to determine if the given pixel cluster is sufficiently slender to represent a wake shape. In one embodiment, the threshold AR is approximately 20:1. If the AR is more slender than the threshold AR, then the aspect ratio test is passed, otherwise the given pixel cluster is rejected (process block 910) as insufficiently slender to represent a wake.

In a process block 925, the results of the analyses performed in process blocks 905, 915, and 920 are collectively used to assign a given pixel cluster with a high or low confidence designation. For example, if the analyses of process blocks 905, 915, and 920 are all passed and the outcomes of both the linear shape analysis and the wake width analysis suggest a high wake confidence, then a given pixel cluster is assigned a high wake confidence designation. As another example, if the analyses of process blocks 905, 915, and 920 are all passed, but one or both of the outcomes of the linear shape analysis or the wake width analysis suggests a low wake confidence, the given pixel cluster is assigned a low wake confidence designation.

Figure 10:
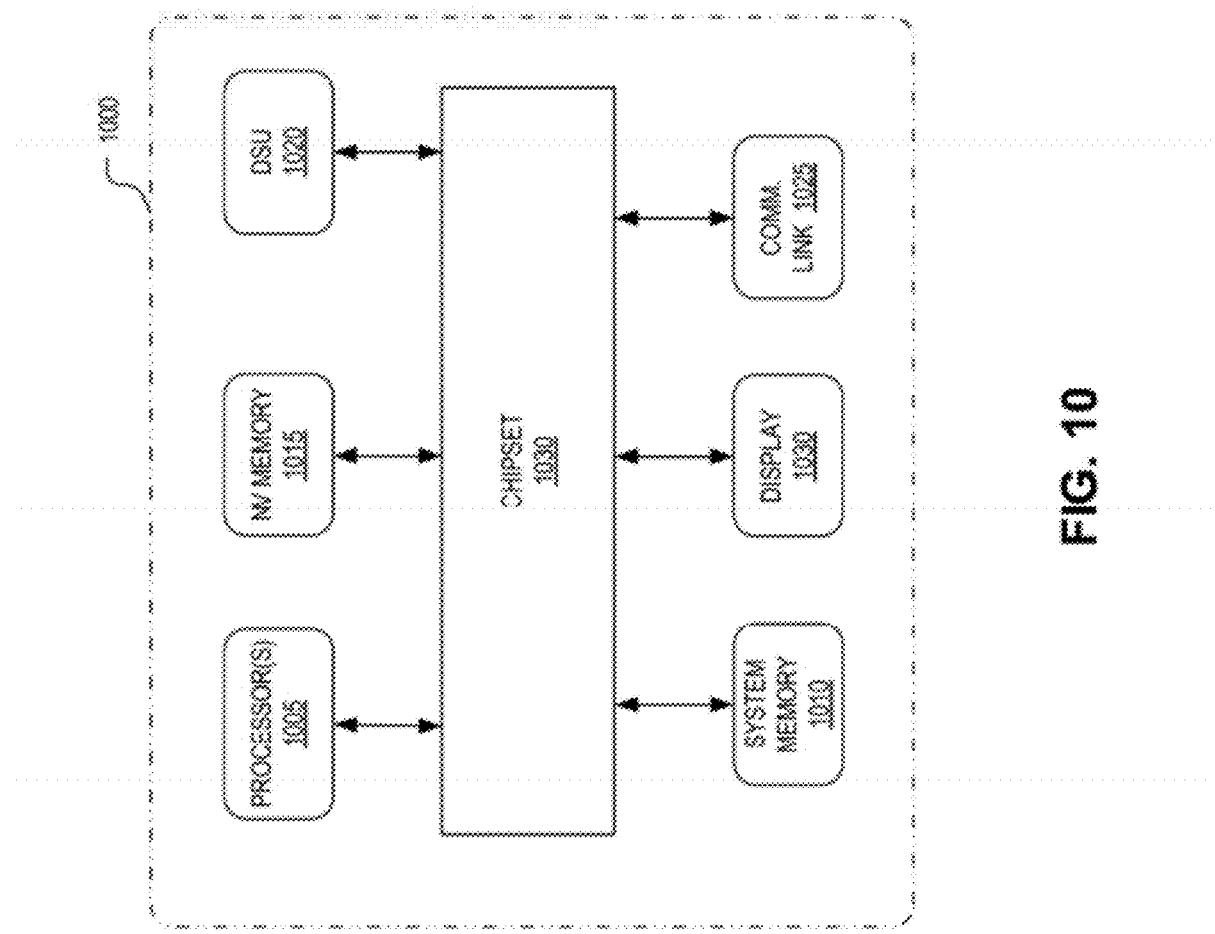
FIG. 10 is a functional block diagram illustrating a processing system for executing embodiments of the vessel detection technique disclosed herein.

FIG. 10 is a block diagram illustrating a demonstrative processing system 1000 for executing any or all of processes 300, 700, 800, or 900. The illustrated embodiment of processing system 1000 includes one or more processors (or central processing units) 1005, system memory 1010, nonvolatile ("NV") memory 1015, a DSU 1020, a communication link 1025, and a chipset 1030. The illustrated processing system 1000 may represent any computing system including a desktop computer, a notebook computer, a workstation, a handheld computer, a server, a blade server, or the like.

The elements of processing system 1000 are interconnected as follows. Processor(s) 1005 is communicatively coupled to system memory 1010, NV memory 1015, DSU 1020, and communication link 1025, via chipset 1030 to send and to receive instructions or data thereto/therefrom. In one embodiment, NV memory 1015 is a flash memory device. In other embodiments, NV memory 1015 includes any one of read only memory ("ROM"), programmable ROM, erasable programmable ROM, electrically erasable programmable ROM, or the like. In one embodiment, system memory 1010 includes random access memory ("RAM"), such as dynamic RAM ("DRAM"), synchronous DRAM, ("SDRAM"), double data rate SDRAM ("DDR SDRAM") static RAM ("SRAM"), and the like. DSU 1020 represents any storage device for software data, applications, and/or operating systems, but will most typically be a nonvolatile storage device. DSU 1020 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1020 is illustrated as internal to processing system 1000, DSU 1020 may be externally coupled to processing system 1000. Communication link 1025 may couple processing system 1000 to a network such that processing system 1000 may communicate over the network with one or more other computers. Communication link 1025 may include a modem, an Ethernet card, a Gigabit Ethernet card, Universal Serial Bus ("USB") port, a wireless network interface card, a fiber optic interface, or the like.

It should be appreciated that various other elements of processing system 1000 have been excluded from FIG. 10 and this discussion for the purposes of clarity. For example, processing system 1000 may further include a graphics card for rendering images to a screen (e.g., image 100, BT image 321, thermal anomaly masks 331, or final detection mask 346), additional DSUs, other persistent data storage devices (e.g., tape drive), and the like. Chipset 1030 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1030. Correspondingly, processing system 1000 may operate without one or more of the elements illustrated. For example, processing system 1000 need not include DSU 1020.

The processes explained above are described in terms of computer software and hardware. The techniques described may constitute machine-executable instructions embodied within a machine. (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (i.e., stores) information in a firm accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for detecting a vessel in water based on an image of a portion of Earth, the method comprising:

generating a thermal anomaly mask flagging each pixel of the image initially deemed to be a wake pixel based on a comparison of a thermal value of each pixel against other thermal values of other pixels localized about each pixel;

grouping contiguous pixels flagged by the thermal anomaly mask into pixel clusters;

analyzing a shape of each of the pixel clusters to determine whether each of the pixel clusters represents a possible vessel detection event; and visually representing any possible vessel detection event within the image.

2. The computer-implemented method of claim 1, wherein generating the thermal anomaly mask comprises:

separating the image into groups, wherein the groups comprise a plurality of overlapping groups of pixels;

generating statistics for each of the groups; and for each of the pixels of the image:
comparing the thermal value of a given pixel to the statistics for each of the groups of which the given pixel is a member; and
flagging the given pixel based on a result of the comparing.

3. The computer-implemented method of claim 2, wherein generating the statistics for each of the groups comprises:
generating a mean thermal value (MTV) for each of the groups; and
generating a thermal standard deviation value (TSDV) for each of the groups, wherein comparing the thermal value of the given pixel to the statistics for each of the groups of which the given pixel is the member comprises comparing the thermal value of the given pixel to a combination of the MTV and the TSDV for each of the groups of which the given pixel is the member, and wherein flagging the given pixel based on the result of the comparing comprises flagging the given pixel based on the result of the comparing for a threshold percentage of the groups including the given pixel.

4. The computer-implemented method of claim 3, wherein the combination of the MTV and the TSDV comprises either [(the MTV)+(n*(the TSDV))] or [(the MTV)−(n*(the TSDV))], where n is a constant multiplier.

5. The computer-implemented method of claim 1, wherein the thermal anomaly mask comprises a cool thermal anomaly mask flagging potential cool wake pixels, the computer-automated method further comprising:

generating a warm thermal anomaly mask flagging potential warm wake pixels within the image; and generating a hot thermal anomaly mask flagging potential hot ship pixels within the image.

6. The computer-implemented method of claim 5, wherein the contiguous pixels comprise first contiguous pixels and the pixel clusters comprise cool wake pixel clusters, the computer-automated method further comprising:

grouping second contiguous pixels flagged by the warm thermal anomaly mask into warm wake pixel clusters; and grouping third contiguous pixels flagged by the hot thermal anomaly mask into hot ship pixel clusters.

7. The computer-implemented method of claim 1, further comprising performing a minimum size cluster test on each of the pixel clusters to filter a false vessel detection event.

8. The computer-implemented method of claim 1, further comprising performing a thermal gradient test on each of the pixel clusters to filter a false vessel detection event, the thermal gradient test comprising:

inspecting at least first and second thermal values within the image on either side of a given pixel cluster; and if the first and second thermal values deviate greater than a threshold gradient value, then rejecting the given pixel cluster as a false vessel detection event.

9. The computer-implemented method of claim 1, wherein analyzing the shape of each of the pixel clusters comprises:

performing a linear shape analysis on a given pixel cluster to generate a linear shape correlation value; and comparing the linear shape correlation value to a threshold linear shape correlation value to determine if the given pixel cluster has a sufficiently elongated shape to represent a wake shape.

10. The computer-implemented method of claim 1, wherein analyzing the shape of each of the pixel clusters comprises:

measuring a width of a given pixel cluster; and comparing the width to a threshold wake width to determine if the given pixel cluster has a sufficiently narrow width to represent a wake shape.

11. The computer-implemented method of claim 1, wherein analyzing the shape of each of the pixel clusters comprises:

determining a best fit line through a given pixel cluster;

determining a length of the best fit line through the given pixel cluster;

determining a width of the given pixel cluster measured normal to the best fit line; and comparing a ratio of the length to the width to a threshold aspect ratio to determine if the given pixel cluster has a sufficiently slender aspect ratio to represent a wake shape.

12. The computer-implemented method of claim 1, further comprising:

assigning one of at least two confidence levels to each of the pixel clusters determined to represent the possible vessel detection event; and visually indicating the confidence levels associated with each of the pixel clusters determined to represent the possible vessel detection event.

13. The computer-implemented method of claim 1, wherein the image comprises an aerial perspective image and the thermal value of each pixel comprises a brightness temperature calculated according to Plank's Law.

14. A non-transitory computer-readable storage medium that provides instructions that, if executed by a computer, will cause the computer to perform operations comprising:

generating a thermal anomaly mask flagging each pixel of an image of a portion of Earth initially deemed to be a wake pixel based on a comparison of a thermal value of each pixel against other thermal values of other pixels localized about each pixel;

grouping contiguous pixels flagged by the thermal anomaly mask into pixel clusters;

analyzing a shape of each of the pixel clusters to determine whether each of the pixel clusters represents a possible vessel detection event; and visually representing any possible vessel detection event within the image.

15. The computer-readable storage medium of claim 14, wherein generating the thermal anomaly mask comprises:

separating the image into groups, wherein the groups comprise a plurality of overlapping groups of pixels;

generating a mean thermal value (MTV) for each of the groups;

generating a thermal standard deviation value (TSDV) for each of the groups; and for each of the pixels of the image:
  comparing the thermal value of a given pixel to a combination of the MTV and the TSDV for each of the groups of which the given pixel is a member; and
  flagging the given pixel based on a result of the comparing for a threshold percentage of the groups including the given pixel.

16. The computer-readable storage medium of claim 15, wherein the combination of the MTV and the TSDV comprises either [(the MTV)+(n*(the TSDV))] or [(the MTV)−(n*(the TSDV))], where n is a constant multiplier.

17. The computer-readable storage medium of claim 14, wherein the thermal anomaly mask comprises a cool thermal anomaly mask flagging potential cool wake pixels, wherein the computer-readable storage medium further provides instructions that, if executed by the computer, will cause the computer to perform further operations, comprising:
  generating a warm thermal anomaly mask flagging potential warm wake pixels within the image; and
  generating a hot thermal anomaly mask flagging potential hot ship pixels within the image.

18. The computer-readable storage medium of claim 17, wherein the contiguous pixels comprise first contiguous pixels and the pixel clusters comprise cool wake pixel clusters, wherein the computer-readable storage medium further provides instructions that, if executed by the computer, will cause the computer to perform further operations, comprising:
  grouping second contiguous pixels flagged by the warm thermal anomaly mask into warm wake pixel clusters; and
  grouping third contiguous pixels flagged by the hot thermal anomaly mask into hot ship pixel clusters.

19. The computer-readable storage medium of claim 14, further providing instructions that, if executed by the computer, will cause the computer to perform further operations, comprising:
  performing a minimum size cluster test on each of the pixel clusters to filter false vessel detection event.

20. The computer-readable storage medium of claim 14, further providing instructions that, if executed by the computer, will cause the computer to perform further operations, comprising:
  performing a thermal gradient test on each of the pixel clusters to filter a false vessel detection event, the thermal gradient test comprising:
    inspecting at least first and second thermal values within the image on either side of a given pixel cluster; and
    if the first and second thermal values deviate greater than a threshold gradient value, then rejecting the given pixel cluster as a false vessel detection event.

21. The computer-readable storage medium of claim 14, wherein analyzing the shape of each of the pixel clusters comprises:
  performing a linear shape analysis on a given pixel cluster to generate a linear shape correlation value; and
  comparing the linear shape correlation value to a threshold linear shape correlation value to determine if the given pixel cluster has a sufficiently elongated shape to represent a wake shape.

22. The computer-readable storage medium of claim 14, wherein analyzing the shape of each of the pixel clusters comprises:
  measuring a width of a given pixel cluster; and
  comparing the width to a threshold wake width to determine if the given pixel cluster has a sufficiently narrow width to represent a wake shape.

23. The computer-readable storage medium of claim 14, wherein analyzing the shape of each of the pixel clusters comprises:
  determining a best fit line through a given pixel cluster;
  determining a length of the best fit line through the given pixel cluster;
  determining a width of the given pixel cluster measured normal to the best fit line; and
  comparing a ratio of the length to the width to a threshold aspect ratio to determine if the given pixel cluster has a sufficiently slender aspect ratio to represent a wake shape.

24. The computer-readable storage medium of claim 14, further providing instructions that, if executed by the computer, will cause the computer to perform further operations, comprising:
  assigning one of at least two confidence levels to each of the pixel clusters determined to represent the possible vessel detection event; and
  visually indicating the confidence levels associated with each of the pixel clusters determined to represent the possible vessel detection event.

25. The computer-readable storage medium of claim 14, wherein the image comprises an aerial perspective image and the thermal value of each pixel comprises a brightness temperature calculated according to Plank's Law.

* * * * *